Sept. 8, 1936.  L. I. DANA  2,053,765

GAUGE GLASS

Filed Jan. 26, 1933

INVENTOR
LEO I. DANA
BY
ATTORNEY

Patented Sept. 8, 1936

2,053,765

UNITED STATES PATENT OFFICE 2,053,765

GAUGE GLASS

Leo I. Dana, Buffalo, N. Y., assignor, by mesne assignments, to Union Carbide and Carbon Corporation, a corporation of New York Application January 26, 1933, Serial No. 653,683

1 Claim. (Cl. 73—54)

The present invention relates to an improved manner of mounting gauge glasses in connection with metallic tubing.

Heretofore it has been a common practice to join gauge glasses with metallic tubing or with pipe connections by employing a packing nut and gland and compressing a soft material into the gland. Gauge glasses joined in this manner are subject to frequent leaks as the packing decomposes or becomes loose because of other causes. A further disadvantage lies in the possibility of fracturing the glass as the nut is tightened in the gland.

In measuring the level of liquid oxygen or similar gases in pressure vessels by means of gauge glasses connected with metallic tubing by methods formerly in use, leaks are especially apt to develop in the packing. The packings heretofore available and considered the most suitable are made of organic materials which are quickly attacked by oxygen at high pressure and also by the halogenated hydrocarbons which are used as measuring fluids. Even the smallest of leaks will cause large inaccuracies in the reading of liquid oxygen level gauges.

It is therefore a primary object of this invention to provide a manner of mounting gauge glasses in connection with metal tubing that will eliminate the necessity of packing.

A further object of this invention is to provide a gauge glass assembly having small flexible metal tubes tightly soldered or joined at either end of a transparent gauge glass.

Figure 1:
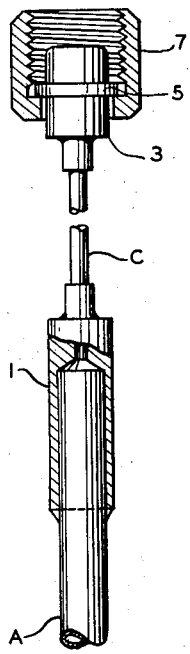
Figure 2:
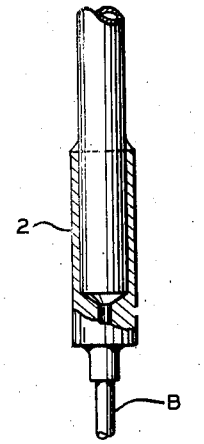
Figure 2:
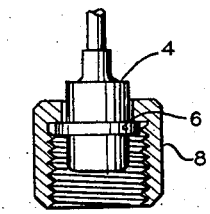
Figure 2:
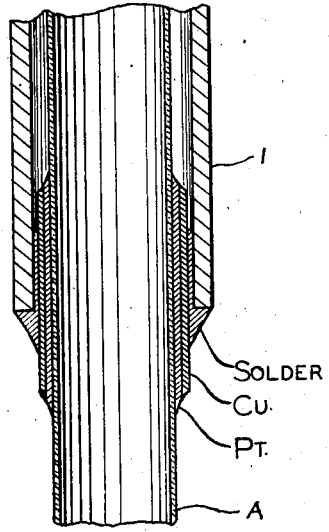

The above and other objects together with the novel features of this invention will be apparent from the following description taken in connection with the accompanying drawing in which Fig. 1 is a cross section of a gauge glass mounting illustrating one embodiment of my invention, and Fig. 2 is an enlarged section of the metal-to-glass joint.

In reference to the drawing, the gauge glass assembly comprises a glass tube A joined at either end to tubing members B and C, which in practice are usually flexible. Members B and C are preferably of small diameter and of a soft material such as copper so as to allow bending and prevent strains from fracturing the glass. The flexible tubing members are provided with sleeves 1 and 2 of a like material or of steel, which has a coefficient of expansion more nearly equal to that of glass. The sleeves are soldered or brazed to the tubing and fit over the ends of the gauge glass A. Members B and C are also provided with flaring nipples 3 and 4 which have annular flanges 5 and 6. Standard rotatable nuts 7 and 8 may be slipped over the tubing and brought to bear against the flanges 5 and 6 for making gas-tight joints with pipe line connections leading to the liquid containing apparatus or pressure vessel.

The glass tube A is soldered at either end to the sleeves 1 and 2 by a method which comprises depositing upon the ends of the glass tube a closely adhering metallic film. I have found that a film of platinum gives exceptionally good results. Such a film may be formed by suspending a salt of platinum in a suitable medium, coating the tube with the suspension at the point where the connection is to be made and then heating the tube causing a decomposition of the platinum compound and a removal of the medium. I have found that platinic chloride suspended in oil of lavender forms a suitable material for carrying out my invention.

In using the method with a suspension of platinic chloride the suspension is prepared and the portion of the tube to be treated is coated with the suspension. The coated portion is then heated in a flame until the oil is driven off and the platinic chloride is decomposed, leaving a thin coating of platinum adhering closely to the glass. When the tube has cooled, the platinized ends are plated with copper by a common electroplating method, employing a copper sulphate solution as a bath. However any other suitable metallic salt may be employed in electrodeposition of a metal which is capable of being tinned or soldered. The plated ends of the glass tube are then prepared for soldering, and a coating of suitable soldering material is applied, using a soft heating flame and an assisting flux. The sleeves 1 and 2 are similarly prepared by applying a coating of solder to the inner cylindrical walls. The gauge glass and the sleeves are then heated until the solder begins to flow. The sleeves are placed over the ends of the gauge glass and excess solder is added until the joint is completely sealed.

A gauge glass when mounted in the described manner may be readily assembled into place between the usual apparatus connections. The flanged nipple and nut joints at the ends of the flexible tubing members B and C are easily made tight without danger of fracturing the glass.

Although a preferred manner of carrying out this invention has been described it should be understood that changes may be made therein without departing from the spirit of this invention. Also, while I have disclosed my invention as applied to a connection for gauge glasses, it is not to be so limited but it includes other similar joints between other shaped bodies of glass and metal.

I claim:

A gauge glass assembly comprising a tubular gauge glass; metallic sleeves fitting over the opposite ends of said glass; gas-tight soldered joints securing said sleeves to said glass; and flexible metallic tubes integrally secured to said sleeves by gas-tight connections; said tubes serving as a nonrigid support for said glass and said joints, whereby said glass and joints are protected from breakage by mechanical shock.

LEO I. DANA.